United States Patent [19]
Rake

[11] Patent Number: 5,878,842
[45] Date of Patent: Mar. 9, 1999

[54] VOLUMETRIC LUBRICANT DISPENSING APPARATUS AND METHOD OF USE FOR SAME

[75] Inventor: Brad Rake, Hubertus, Wis.

[73] Assignee: Trico Manufacturing Corporation, Pewaukee, Wis.

[21] Appl. No.: 820,124

[22] Filed: Mar. 19, 1997

[51] Int. Cl.⁶ .............. F16N 29/02; F01M 1/18; F01M 1/20
[52] U.S. Cl. .............. 184/6.4; 184/7.4; 184/37; 184/108
[58] Field of Search ............ 184/6.4, 7.4, 8, 184/37, 108, 27.1, 103.1, 103.2; 384/462, 448

[56] References Cited

U.S. PATENT DOCUMENTS

| | | | |
|---|---|---|---|
| 1,864,195 | 6/1932 | Hall | 184/27.1 |
| 4,990,057 | 2/1991 | Rollins | 184/6.4 |
| 5,271,528 | 12/1993 | Chien | 184/5.1 |
| 5,273,134 | 12/1993 | Hegemier et al. | 184/6.4 |
| 5,332,064 | 7/1994 | Liu | 184/6.4 |
| 5,381,874 | 1/1995 | Hadank et al. | 184/6.4 |
| 5,634,531 | 6/1997 | Graf et al. | 184/108 |
| 5,671,825 | 9/1997 | Wong et al. | 184/6.4 |

FOREIGN PATENT DOCUMENTS 2-308916  12/1990  Japan ..................... 184/108

*Primary Examiner*—Christopher Verdier
*Attorney, Agent, or Firm*—Ryan Kromholz & Manion

[57] ABSTRACT

A volumetric lubricant dispensing apparatus for delivering a precise volume of lubricant, such as oil, to a rotating machine element. The delivery mechanism includes a piston and cylinder assembly. A plurality of sensors are utilized to record operating conditions of the machine, element, environment, and lubricant. The apparatus is controlled either manually or with the aid of a controller unit such as a microprocessor. The output from each sensor is inputted into the microprocessor wherein an algorithm computes an responsive output. The responsive output is sent to the piston and cylinder assembly which maintains an optimum lubricant condition within the reservoir wherein a rotating machine element located.

10 Claims, 2 Drawing Sheets

VOLUMETRIC LUBRICANT DISPENSING APPARATUS AND METHOD OF USE FOR SAME

BACKGROUND OF THE INVENTION

Lubrication is an important aspect of maintaining machinery in proper operating condition. Machine elements such as bearings, journals, shafts, and joints require proper lubrication between their moving surfaces to decrease friction, prevent contamination, reduce wear and dissipate heat. Improper lubrication is likely to lead to premature component wear and component or system failure.

When determining the optimal lubrication between moving machine elements, many factors should be considered. These factors include the mode of operation of the machine, the type of machine element to be lubricated, the environment of the machine, the operating speed of the machine, the lubricant's viscosity, the lubricant's temperature, the lubricant's ingredients, and the lubricant's condition.

The present invention relates to an apparatus for supplying an optimum amount of lubricant to a machine element in order to achieve peak lubrication. Prior art lubricators, such as the TRICO OptoMatic oiler, supply a constant level of lubricant within a lubricant reservoir to a machine element. The lubricant level is predetermined for the particular application and cannot be changed during the operating time of the machine to which the constant level lubricator is attached. Although this type of lubricator provides reasonable performance in many steady-state operations, multiple variables can create unacceptable operating conditions and lead to premature wear, or even failure, of machine elements. The variables include "on" and "off" operating modes (machine cycling), oil viscosity, machine speed, lubricant temperature, lubricant condition, and lubricant vessel pressure.

The present volumetric lubricant dispenser controls all of the above variables to provide optimum operating conditions. An automatically controlled system is adjusted by means of a microprocessor that receives input from various system sensors and adjusts the lubricant level accordingly. In the automatic mode, the entire system is constantly monitored. The manually controlled system is adjusted by the machine operator based upon external measurements such as temperature, pressure, electrical current draw, etc.

SUMMARY OF THE INVENTION

The volumetric lubricant dispensing apparatus of the present invention relates generally to the field of lubrication and specifically to the field of devices which deliver a constant volume and quality of lubricant to a machine element. The present volumetric lubricant dispenser is designed to deliver a precise volume of lubricant to a rotating element or machine part. The rotating element may include a bearing or a journal or the combination of the two. In a typical application, a bearing includes an inner and an outer race. Between the races a plurality of rolling elements, usually balls, are positioned. If the outer race is attached to the bearing housing, the inner race and the rolling elements are rotated into and out of a lubricant reservoir. The reservoir is maintained within the bearing housing.

Lubricant is supplied to the reservoir at a rate sufficient to maintain a volume of oil in the reservoir so that the lubricant is applied to the rotating element or machine part in the same manner for each rotation of the element. The lubricant delivery system of my invention is essentially a piston and cylinder assembly. The piston will maintain a lubricant volume in a predetermined condition where the rotating element can pick up the optimum amount of lubricant required for optimal lubrication.

The present invention overcomes a problem experienced in the field with prior art lubricant dispensers. A rotating element, such as a journal, will create a wave form within the lubricant contained within the lubricant reservoir. Accordingly, the position or location of the lubricant in the reservoir is not constant. For example, the level of lubricant at one side of the reservoir may be lower than the lubricant level at the opposite side of the reservoir. As the speed of the rotating journal is increased or decreased, the wave form may become more or less pronounced.

Before proper lubrication of the rotating element can be achieved, there are a number of variables which must be considered. These include: the difference in lubrication level between the "on" and "off" operating modes (cycling modes) of the machine element being lubricated, the viscosity of the lubricant, the type of lubricant used and its condition, and the pressure within the lubrication system. It is a goal of the present invention to provide a volumetric lubricant dispenser which can control all of the above noted variables and insure an acceptable operating condition. The device of the present invention is envisioned to be either automatic or manual in its mode of operation.

The present invention controls the volume of lubricant and/or maintains the consistency of the lubricant supplied to the reservoir by dispensing the lubricant with an actuated plunger located in a dispensing cylinder. The dispensing cylinder is coupled to the reservoir. The plunger is actuated by means of a drive motor which either advances or retracts the plunger depending upon a command or signal received from a control unit or microprocessor which monitors at least one condition of the lubricant. For example, if the temperate of the lubricant is being monitored, temperature data would be input into an algorithm or formula programmed into the microprocessor or similar control device. The amount of lubricant in the reservoir could be increased or decreased depending upon the temperature input and the algorithm output. Additionally, other variables of the lubricant can be measured and the volume of the lubricant adjusted accordingly. Another example may include the viscosity of the lubricant, the speed of the rotating element, the pressure within the reservoir, or the lubricant's condition. Alternatively, the relative acidity of the lubricant could be monitored and compared against a base line level and the amount of lubricant required within the reservoir could be adjusted accordingly. This type of monitoring allows for fresh lubricant to be added to the reservoir as the present lubricant is consumed, chemically broken down, or contaminated.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
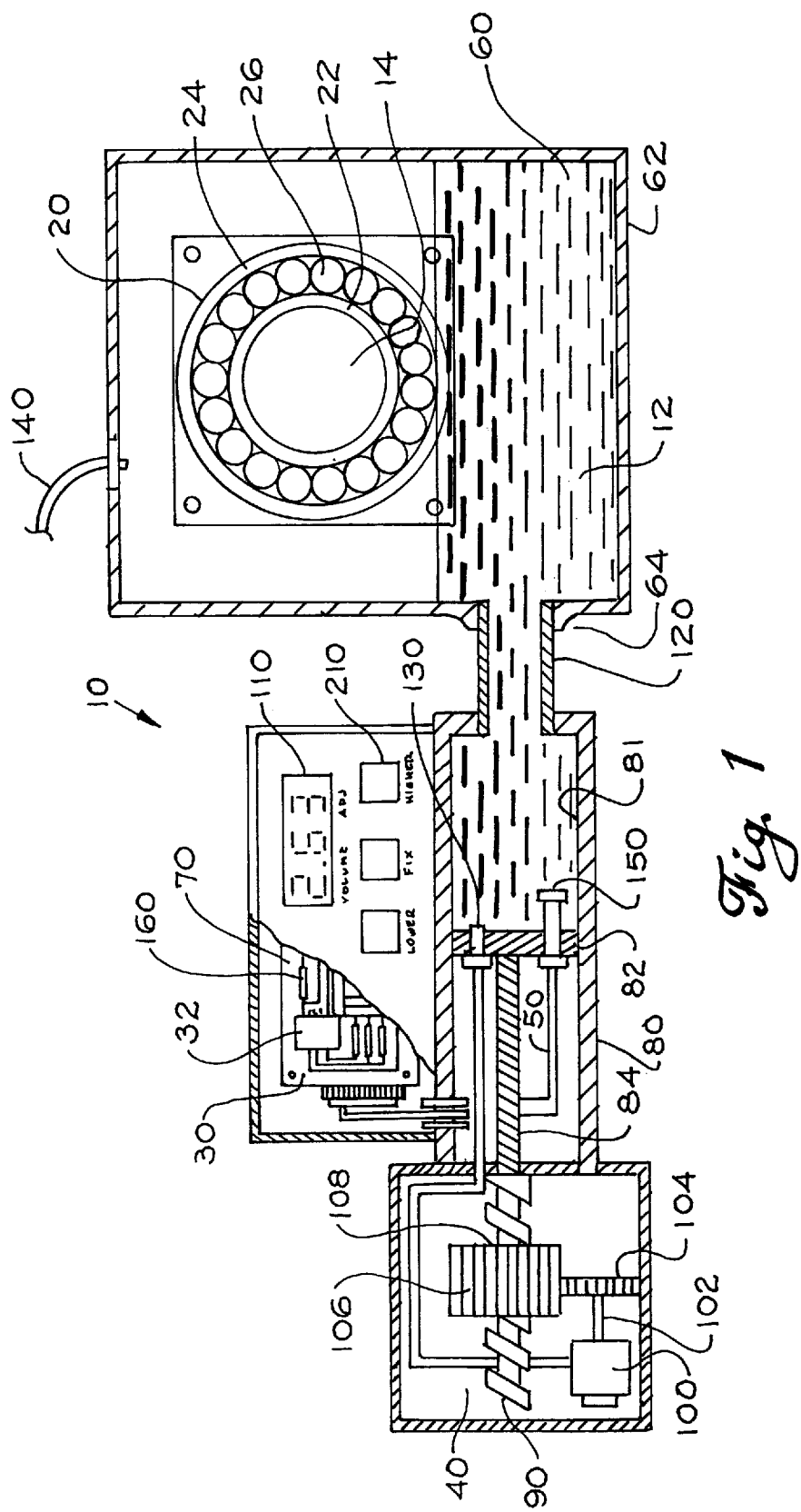
FIG. 1 is a partially cut away front elevational view of the volumetric lubricant dispensing apparatus.

The present invention comprises a volumetric lubricant dispensing apparatus. The invention is best shown in FIG. 1 at reference number 10. The components of my invention can be seen to include a control unit 30, a drive unit 40, a dispensing mechanism 50, a reservoir 60, a printed circuit board 70, a plunger 82, a drive screw 90, a drive motor 100, a liquid crystal display 110 and an adapter fitting 120. In addition, there are multiple sensors that complete the system. These sensors include a temperature sensor 130, a vibration sensor 140, a pressure sensor 150 and a power primary sensor 160. The invention provides an optimal lubrication condition to machine element or bearing 20.

Lubricant 12, such as oil, is contained within the fluid reservoir 60. In my preferred embodiment, the fluid reservoir comprises a bearing housing shown in FIG. 1 at 62. A bearing, shown at 20 in FIG. 1, is located within the bearing housing 62. Bearing 20 includes an inner race 22, an outer race 24, and a plurality of rolling ball elements 26 positioned between inner race 22 and outer race 24. In order for bearing 20 to perform its function of maintaining a low friction precision relationship between rotating element or shaft 14 and bearing housing 62, the bearing 20 must operate in an environment where it receives proper lubrication.

To achieve proper lubrication, bearing housing 62 or reservoir 60 is filled with a predetermined amount of lubricant 12. When the machine of which bearing 20 is a component is in a static state, the amount of lubricant 12 within the housing 62, the pressure of the lubricant 12, the distribution of the lubricant 12 within the housing 62 and the temperature of the lubricant 12 are constant. Once the machine is set in motion and journal 14 begins to rotate, the lubricant's characteristics begin to change. These characteristics can continue to change during the run cycle of the machine.

Bearing housing 62 includes an opening or passageway 64 that allows for the addition and removal of lubricant 12. Passageway 64 is connected to an adapter fitting 120. Adapter fiting 120 fluidly connects bearing housing 62 with the volumetric lubricant dispenser 10. Fiting 120 could be replaced with a pipe or tube to suit the application.

Volumetric lubricant dispenser 10 includes a cylinder 80 within which a plunger 82 is sealed about the cylinder's inner surface 81. A connecting rod 84 is connected to the back side of the plunger 82 and extends through the dispenser 10 where its opposite end is connected to a screw drive 90.

A drive motor 100 is mounted within the dispenser 10. A drive shaft 102 is connected to the drive motor 100 output. The drive shaft 102 is in turn connected a drive gear 104. The gear teeth of drive gear 104 engage with similar gear teeth on the exterior surface of driven gear 106. Driven gear 106 has a geared opening or aperture 108 which runs through its central portion and which engages with screw drive 90. Thus, when drive motor 100 operates in a first direction, plunger 82 is driven into cylinder 80. When drive motor 100 operates in the second opposite direction, plunger 82 is retracted from cylinder 80. As can be seen in FIG. 1, additional lubricant 12 is displaced into bearing housing 62 when the plunger 82 is driven into cylinder 80. Conversely, lubricant is removed from bearing housing 62 when the plunger 82 is retracted.

Various sensors are placed on the volumetric lubricant dispenser 10. Each sensor provides an input to the printed circuit board 70 which contains a controller or microprocessor 32. Drive motor 100 is controlled by an output of the printed circuit board 70. When a sensor feeds input into the microprocessor 32 of the printed circuit board 70 indicating that either more or less lubricant is needed in the bearing housing 62, the microprocessor 32 sends a signal to drive motor 100. Drive motor 100 is capable of rotating in both a clock-wise and a counter-clock-wise direction. Depending upon the signal sent, the drive motor 100 operates in either a clock-wise or counter-clock-wise direction. Rotation in a clock-wise direction will cause drive screw 90 to push plunger 82 further into cylinder 80 and thus raise the lubricant level within bearing housing 62. Rotation in a counter-clock-wise direction will, alternatively, cause the plunger 82 to retract from cylinder 80 and thus decrease the lubricant level in bearing housing 62.

Referring again to FIG. 1, the location of the various sensors can be seen. The sensors incorporated into my invention include a temperature sensor 130, a vibration sensor 140, a pressure sensor 150, and a power sensor 160. Each sensor 130–160 is electronically connected to circuit board 70 and provides an input signal to the microprocessor 32.

My volumetric lubricant dispenser 10 includes a digital read-out 110 capable of displaying the input from at least one of the sensors 130–160. For example, the temperature of the lubricant or the pressure of the lubricant can be displayed on read-out 110. The dispenser 10 also includes control switches 210. These switches are used to manually control the lubricant level within bearing housing 62 either during set up, start up, or during manual operation.

Sensor 130 monitors the temperature of the lubricant. A bearing operating in an poorly lubricated environment will dissipate excess heat generated by the bearing into the lubricant. If the lubricant begins to break down, it cannot properly perform its function of providing a reduced friction substrate between the bearing components and dissipating heat away from the bearing. If the lubricant temperature exceeds a known level, the microprocessor 32 signals drive motor 100 to add more lubricant to the bearing housing 62. The additional lubricant 12 helps to rejuvenate the present lubricant and helps to dissipate excess heat.

Sensor 140 is a vibration sensor that monitors the vibration of bearing housing 62. Again, improper lubrication of bearing 20 may result in a vibration in excess of a preset maximum vibration level. When the maximum vibration level is exceeded, sensor 140 sends a signal to the microprocessor 32 whereby additional lubricant is again added to the bearing housing 62.

Pressure sensor 150 constantly monitors the lubricant pressure within bearing housing 62. If the pressure falls below a predetermined setting, improper lubrication of bearing 20 is likely to occur. In this situation, the microprocessor 32 would send a signal to the drive motor thereby adding more lubricant 10 to the bearing housing 60, increasing the lubricant level, and increasing the lubricant pressure above the required minimum.

Sensor 160 comprises a power sensor. This sensor is attached to the machine of which the bearing 20 is a component. Power sensor 160 determines when the machine is in an operational mode and thus controls the remaining sensors 130–150. My invention 10 is designed to operate and respond to the other sensors 130–150 only when the machine of which bearing 20 is a component is running.

Figure 2:
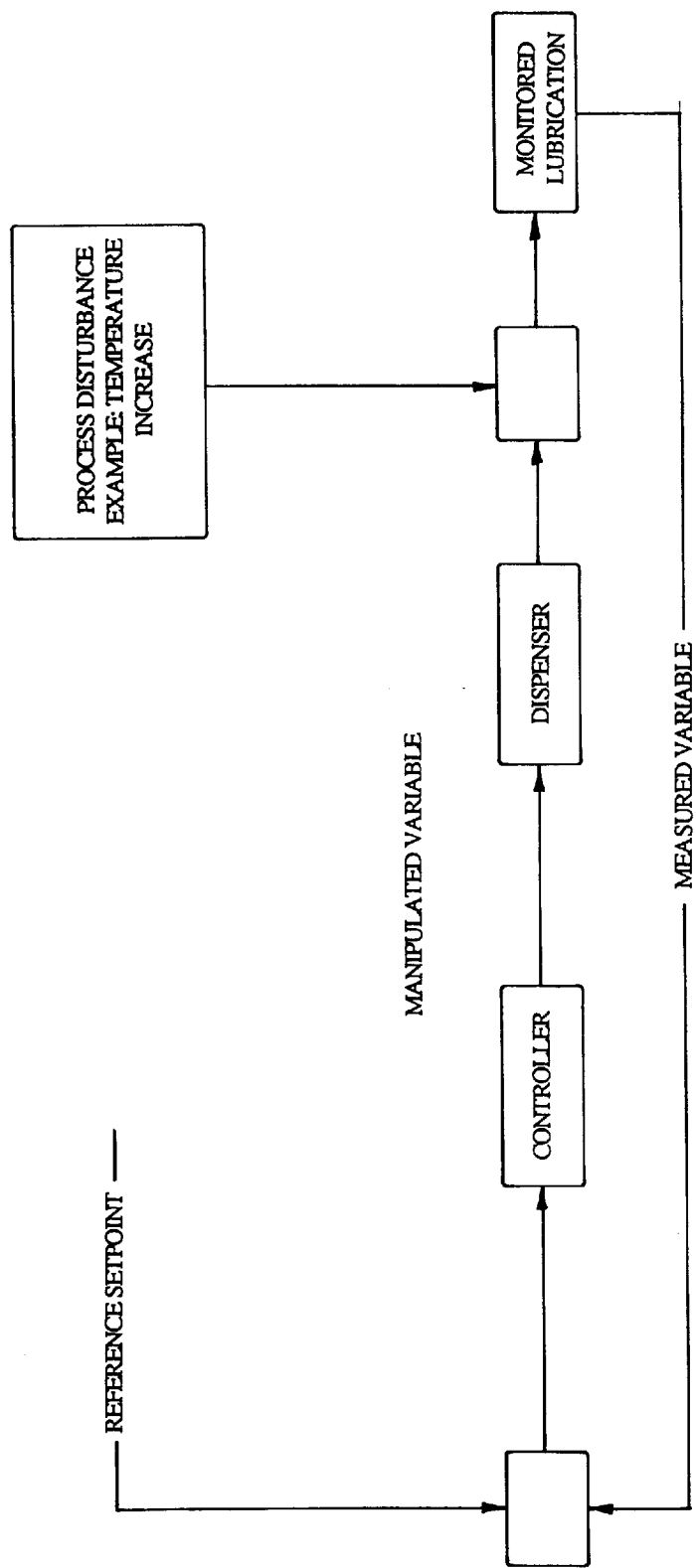
FIG. 2 is a flow chart depicting the control loop control of the volumetric lubricant dispensing apparatus.

FIG. 2 depicts a flow chart of the closed loop control operation of my invention 10. Beginning at the reference set point, the nominal or minimum operating parameters are preset from the component operational requirements of the machine elements. For example, the nominal or minimum operating conditions of the bearing 20 are entered into the controller 30. When one or more of the monitored lubrication sensors 130 through 160 (measured variables) sends a signal to the controller 30 indicating that its parameters have been exceeded, the controller 30 sends a signal to drive unit 40. It should be noted that in the process disturbance step the lubricant conditions being monitored include any or all of the lubricant conditions discussed herein. When the monitored lubricant condition exceeds the reference set point or parameter, the controller 30 sends a signal to the drive unit 40 instructing it to act accordingly.

For example, when the monitored process begins, each sensor 130 through 160 begins with a verifications that the condition it monitors (measured variable) is within the allowable pre-programmed range. If each sensor indicates that its condition falls within the required range, the monitored process is continued with no drive unit 40 and dispenser mechanism 50 actuation. If one or more of the sensors 130 through 160 senses a condition that falls outside of the predetermined parameter range, the controller 30 sends a signal to the drive unit 40 thereby instructing it to actuate the drive motor 100 in either the forward direction or backward direction whereby the lubricant volume is either increased or decreased. Once the lubricant volume has been adjusted, the monitoring process resumes.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A volumetric lubricant dispensing apparatus for sensing lubricant condition and dispensing lubricant into a housing having a machine element to be lubricated, the apparatus comprising: a control unit, a dispensing mechanism, and at least one sensor;

the control unit being coupled to the dispensing mechanism; the dispensing mechanism being fluidly coupled to said housing;

the level of lubricant within the housing capable of being volumertically increased and decreased by the dispensing mechanism sensing said lubricant condition;

the sensor being communicatively coupled to the control unit.

2. The volumetric lubricant dispensing apparatus of claim 1 wherein the sensor is a temperature sensor.

3. The volumetric lubricant dispensing apparatus of claim 1 wherein the sensor is a pressure sensor.

4. The volumetric lubricant dispensing apparatus of claim 1 wherein the sensor is a vibration sensor.

5. The volumetric lubricant dispensing apparatus of claim 1 wherein the sensor is a power sensor.

6. A volumetric lubricant dispensing apparatus for sensing lubricant condition and dispensing lubricant within a reservoir having a machine element, said apparatus comprising: a dispensing mechanism for volumetrically increasing and decreasing a quantity of lubricant in said reservoir, the dispensing mechanism having a cylinder and a piston; the piston being sealably positioned within said cylinder; a moving mechanism for moving said piston, said moving mechanism being coupled to said piston; the cylinder being fluidly connected to said reservoir; at least one sensor, said sensor being communicatively coupled to a microprocessor; the microprocessor being communicatively coupled to the moving mechanism.

7. The apparatus of claim 6 wherein the sensor is a temperature sensor.

8. The apparatus of claim 6 wherein the sensor is a pressure sensor.

9. The apparatus of claim 6 wherein the sensor is a vibration sensor.

10. apparatus of claim 6 wherein the sensor is a power sensor.

\* \* \* \* \*